United States Patent [19]

Hosaka

[11] 4,184,992
[45] Jan. 22, 1980

[54] CROSS-LINKED ALKYL METHACRYLATE-N-VINYLLACTAM POLYMER COMPOSITION FOR USE IN SOFT CONTACT LENSES

[75] Inventor: Shuntaro Hosaka, Kamakura, Japan

[73] Assignee: Toray Industries, Inc., Tokyo, Japan

[21] Appl. No.: 848,357

[22] Filed: Nov. 3, 1977

[30] Foreign Application Priority Data

Nov. 4, 1976 [JP] Japan .................. 51/132538

[51] Int. Cl.$^2$ .................. C08L 39/06; C08L 33/10; C08L 31/06
[52] U.S. Cl. .................. 260/29.7 T; 351/160 H; 526/62; 526/64; 526/261; 526/264; 526/273; 526/320; 526/322; 526/327; 526/329.7
[58] Field of Search .............. 260/29.6 HN, 29.6 TA, 260/29.7 T

[56] References Cited

U.S. PATENT DOCUMENTS

| 3,532,679 | 10/1970 | Steckler ........................ 526/260 |
| 3,772,235 | 11/1973 | Stamberger ................ 260/29.6 HN |
| 3,949,021 | 4/1976 | Kunitomo et al. ............ 260/895 |

FOREIGN PATENT DOCUMENTS

1391438 4/1975 United Kingdom .

*Primary Examiner*—Harold D. Anderson
*Attorney, Agent, or Firm*—Finnegan, Henderson, Farabow & Garrett

[57] ABSTRACT

Provided is a cross-linked polymer composition which can be in a transparent polymeric gel form having an equilibrium water content of at least 60 wt.% for use in soft contact lenses. The cross-linked polymer composition is prepared by polymerizing, using a bulk polymerization procedure, a monomer mixture comprising an alkyl methacrylate and an N-vinyllactam in the presence of a cross-linking agent comprising at least one compound selected from vinyl acrylate, vinyl methacrylate, triallyl isocyanurate and vinyl carboxylates expressed by the formula:

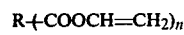

$$R(COOCH=CH_2)_n$$

where R is a hydrocarbon radical having 1 to 10 carbon atoms and n is an integer of 2, 3 or 4.

12 Claims, No Drawings

CROSS-LINKED ALKYL METHACRYLATE-N-VINYLLACTAM POLYMER COMPOSITION FOR USE IN SOFT CONTACT LENSES

Water-containing gels of 2-hydroxyethyl methacrylate (hereinafter referred to as "HEMA" for brevity) polymers have been widely used in so-called "soft contact lenses", because soft contact lenses made from such water-containing gels possess good transparency and do not irritate the eyeballs during wearing. However, these soft contact lenses are poor in permeability to some substances such as oxygen. When the soft contact lenses are worn during sleeping, cornea lesions sometimes occurred due to shortage of oxygen. Therefore, such lens must be removed before sleeping.

In general, permeability of water-containing polymeric gels to oxygen increases with an increase of the water content. Therefore, HEMA/N-vinylpyrrolidone copolymer gels have recently been proposed for use in making soft contact lenses. Such gels are prepared by copolymerizing HEMA with N-vinylpyrrolidone or graft-copolymerizing HEMA onto poly-N-vinylpyrrolidone. The HEMA/N-vinylpyrrolidone copolymer gels exhibit an equilibrium water content of 70% or more at 37° C., although a HEMA homopolymer gel has an equilibrium water content of less than about 40%. However, the HEMA/N-vinylpyrrolidone copolymer gels are still not satisfactory in that they are poor in mechanical strengths. Accordingly, soft contact lenses made therefrom are liable to be fragile.

Cross-linked copolymers of N-vinyllactam and other methacrylic acid esters such as methyl methacrylate have also been proposed for use in soft contact lenses. Water-containing gels of these cross-linked copolymers generally exhibit somewhat improved mechanical strengths as compared with HEMA/N-vinylpyrrolidone copolymers. Various cross-linking agents have been proposed for use in the preparation of these cross-linked copolymers. For example, U.S. Pat. No. 3,532,679 discloses the use of tetraethylene glycol dimethacrylate. British Pat. No. 1,391,438 discloses the use of divinylbenzene, ethylene glycol dimethacrylate, allyl methacrylte, diethylene glycol bis(allylcarbonate) and the like. However, these cross-linked N-vinyllactam/methacrylic acid ester copolymers are still not satisfactory as materials for use in soft contact lenses which can be worn continuously for a long period of time, because they do not comletely safisfy the requisites stated below.

The requisites for water-containing polymeric gels for use in soft contact lenses which can be worn continuously for a long period of time will be explained in the following. First, the water-containing polymeric gels should possess an equilibrium water content of at least 60%, preferably from 65% to 80%, t 37° C., for providing the desired permeability to oxygen. In general, as the equilibrium water content increases, the mechanical properties of the polymeric gels are liable to become undesirable. It is preferable that the polymeric gels possess a tensile strength of at least 10 kg/cm$^2$, an elongation at break of at least 100%, and more preferably a product of the tensile strength and the elongation being at least 1,500. Secondly, the polymeric gels should not become opaque, distorted, or colored. Their mechanical strengths should not become reduced upon immersing in boiling water, which immersion is popularly carried out for sterilization. Furthermore, the polymeric gels should contain little or no water-soluble, extractable matter which can be dissolved during wearing of the soft contact lenses.

U.S. Pat. No. 3,949,021 discloses a cross-linked N-vinylpyrrolidone polymer for use in soft contact lenses, which polymer is prepared by polymerizing N-vinylpyrrolidone in the presence of (i) a water-insoluble polymer, dissolved in N-vinylpyrrolidone, such as polymethyl methacrylate, and (ii) a cross-linking agent. However, the polymer product is mainly comprised of polymethyl methacrylate and a cross-linked poly-N-vinylpyrrolidone, and is not satisfactory in the following. First, soft contact lenses made from the polymer product are poor in dimensional stability upon immersion in boiling water. Second, a polymethyl methacrylate solution in N-vinylpyrrolidone is too viscous to be easily handled for the polymerization operation. That is, it is difficult to prepare the polymer solution of a concentration of more than approximately 20% by weight, to filter the polymer solution for the removal of foreign matters therefrom, and, furthermore, to uniformly dissolve a polymerization initiator in the polymer solution. Third, the resulting polymer product is poor in resistance to organic solvents.

It is a main object of the present invention to provide a cross-linked polymer composition which can become a transparent polymeric gel for use in soft contact lenses, which polymeric gel completely satisfies the above-mentioned requisites, i.e. a gel which possesses an equilibrium water content of at least 60% by weight and improved mechanical properties, and which contains little or no water-soluble, extractable matter and is not changed both in shape and dimension upon immersion in boiling water.

Other objects and advantages of the present invention will be apparent from the following description.

The cross-linked polymer composition according to the present invention can provide a transparent polymeric gel having an equilibrium water content of at least 60% by weight for use in soft contact lenses, which polymer composition being prepared by polymerizing, using a bulk polymerization procedure, a monomer mixture comprising an alkyl methacrylate and an N-vinyllactam in the presence of a cross-linking agent comprising at least one compound selected from the group consisting of vinyl acrylate, vinyl methacrylate, triallyl isocyanurate and vinyl carboxylates expressed by the formula:

$$R \text{---} (COOCH=CH_2)_n \qquad (I)$$

where R is a hydrocarbon radical having 1 to 10 carbon atoms and n is an integer of 2, 3 or 4.

One main point of the present invention resides in the cross-linking agent used.

N-vinyllactams and alkyl methacrylates have poor capability for being copolymerized with each other. When they are copolymerized, the resulting polymer product is mainly comprised of two copolymer ingredients: a copolymer ingredient derived from a major amount of an alkyl methacrylate and a minor amount of an N-vinyllactam, and a copolymer ingredient derived from a major amount of an N-vinyllactam and a minor amount of an alkyl methacrylate. The alkylmethacrylate-rich copolymer ingredient and the N-vinyllactam-rich copolymer ingredient are liable to be subject to phase-separation, and therefore, the polymer product comprising these two copolymer ingredients tends to become undesirably opaque. In order to overcome this defect, the respective copolymers should have a cross-linked structure possessing a moderate degree of cross-linking. However, most conventional cross-linking agents tend to produce a polymer product of which one copolymer ingredient (usually, the alkyl acrylate-rich copolymer ingredient) exhibits a far enhanced degree of cross-linking as compared with the other copolymer ingredient. In contrast to this fact, the cross-linking agents used in the present invention can advantageously provide a moderate degree of cross-linking to the two copolymer ingredients.

The alkyl methacrylates used for the preparation of the polymer composition of the invention are preferably those methacrylates whose the alkyl group possesses 1 to 4 carbon atoms. The N-vinyllactams used for such preparation are, for example, N-vinyl-2-pyrrolidone, N-vinyl-2-piperidone and N-vinyl- -caprolactam. A combination of methyl methacrylate as the alkyl methacrylate and N-vinylpyrrolidone as the N-vinyllactam is preferable because these two monomers are readily available.

The monomer mixture may comprise, in addition to the alkyl methacryate and the N-vinyllactam, a small amount of at least one other copolymerizable monoethylenically unsaturated monomer for the purpose of, for example, forming a water-containing polymeric gel having desirably controlled hardness and mechanical properties. This additional monomer can be selected from, for example, alkyl acryltes (the alkyl group of which possesses 1 to 4 carbon atoms), acrylonitrile, styrene, vinyl acetate and 2-hydroxyethyl methacrylate.

The monomer mixture should preferably comprise 10 to 40% by weight of alkyl methacrylate, 60 to 80% by weight of N-vinyllactam and 0 to 20% by weight of at least one other copolymerizable monoethylenically unsaturated monomer, based on the total weight of the monomer mixture.

The cross-linking agent used for the preparation of the polymer composition of the invention may comprise vinyl acrylate, vinyl methacrylate, triallyl isocyanurate or vinyl carboxylates expressed by the above-mentioned formula (I). These compounds may be used alone or in combination. The amounts of these compounds are preferably from 0.01 to 5.0% by mole, more preferably from 0.05 to 1.0% by mole, per mole of the above-mentioned monomer mixture.

The "R" in the above-mentioned formula (I) may be selected from, for example, saturated and unsaturated aliphatic radicals such as $+CH_2+_{1-10}$ and $+CH=CH+$; cycloaliphatic radicals such as cyclohexane radical; and aromatic radicals such as benzene radical. The vinyl carboxylate expressed by the formula (I) may be selected from, for example, divinyl succinate, divinyl glutarate, divinyl adipate, divinyl maleate, divinyl fumarate, divinyl cyclohexane-1,4-dicarboxylate, divinyl phthalate, divinyl isophthalate, divinyl terephthalate, trivinyl trimellitate, tetravinyl pyromellitate trivinyl butenetricarboxylate and tetravinyl butanetetracarboxylate.

In addition to the above-mentioned cross-linking agents, minor amounts of at least one other cross-linking agent may be used. Preferable cross-linking agents used in addition to the above-mentioned cross-linking agents are polyethylene glycol dimethacrylates which are expressed by the formula:

$$CH_2=C.COO+CH_2CH_2O+_nCO.C=CH_2 \quad (II)$$
with $CH_3$ groups on the central carbons wherein n is an integer of from 2 to 6. Typical polyethylene glycol dimethacrylates of the formula (II) are di-, tri- and tetra-ethylene glycol dimethacrylates. The amount of this additional cross-linking agent is less than 50% by mole based on the total amounts of the cross-linking agents, i.e. less than one mole per mole of the cross-linking agent used together with the additional cross-linking agent. Preferably, the amount of the additional cross-linking agent is below 0.5 mole per mole of the cross-linking agent used together with the additional cross-linking agent.

The bulk polymerization of the monomer mixture is carried out in the presence of a polymerization initiator. The polymerization initiator used may be selected from conventional free-radical initiators, which may be selected from, for example, organic and inorganic peroxides such as di-tert.-butylperoxide and ammonium persulfate; and azo compounds such as 2,2'-azobisisobutyronitrile, 2,2'-azobis-2,4-dimethylvaleronitrile, 2,2'-azobis(4-methoxy-2,4-dimethylvaleronitrile and 1,1'-azobiscyclohexane-1-carbonitrile. Besides these thermally decomposing-type polymerization initiators, photosensitizers may be used which include, for example, acetophenone, benzophenone, xanthone, benzoin and benzoin ethyl ether. The amount of the polymerization initiator is from 0.001 to 1.0% by mole, preferably 0.005 to 0.5% by mole, based on the amount of the monomer mixture.

It is preferable that, as the polymerization proceeds, the polymerization temperature be increased either in a stepwise manner or in a continuous manner. When a thermally decomposing-type polymerization initiator is used, the polymerization temperature may preferably be set at a temperature of from 10° to 50° C. at the initial stage and at a temperature of from 90° to 160° C. at the final stage. When a photosensitizer is used with, for example, ultraviolet light irradiation from a high pressure mercury lamp, the polymerization temperature may be set at a temperature of from 0° to 40° C. at the initial stage.

If desired, a combination of two or more thermally decomposing-type initiators having different decomposing temperatures or a combination of at least one thermally decomposing-type initiator and at least one photosensitizer may be used.

The polymerization product obtained may be in a desired shape such as a rod, plate or any other block shapes. However, a rod-shaped product with a circular cross-section is most preferable. The rod-shaped polymer is formed by carrying out bulk polymerization within a tube exhibiting a circular cross-section, preferably disposed in a substantially vertical direction and having an inner diameter of from 10 to 20 mm and a wall thickness of from 0.5 to 3 mm. In view of the fact that the polymer product can be separated from the inner wall of the tube due to the shrinkage of the polymer product before completion of the polymerization, it is preferable that the tube is made of polypropylene, high density polyethylene or polyfluoroethylene. Of these components, polypropylene is optimum. The tube may be of a length of from 10 to 50 cm. The bottom of the tube may be made of the same material as that of the tube wall.

Soft contact lenses may be manufactured from the polymer block as described hereinafter. Button-like articles are cut from the block, and then subjected to lathing, polishing and then swelling in physiological salt solution or water. The water-soluble, extractable matter may be removed either by using the above-mentioned swelling treatment in physiological salt solution or water or by immersing the article, treated by swelling, further in water at approximately 100° C. for a period of at least 6 hours, preferably from 10 to 30 hours.

The dry polymer composition of the invention exhibits an extraction-retention percentage of from 85% to 95% by weight as measured after being immersed in water at 100° C. for 16 hours, although such an extraction-retention value is less than that of the conventional polymer used in soft contact lens. When the extraction-retention percentage is too small, the resulting contact lenses are poor in elongation at break, and fragile. In contrast, when the extraction-retention percentage is too large, it is difficult to completely remove the water-soluble, extractable matter therefrom and the soft contact lenses are poor in dimensional stability upon immersion in boiling water.

It has been found that the water-containing polymeric gels in the form of discs or lenses obtained from a cylindrical polymer rod exhibit a substantially constant D value, which is defined by the following equation, i.e. a D value of 1.19±0.07.

$$D = \left(\frac{100\beta^3}{ER} - 1\right)\left(\frac{100}{W} - 1\right)$$

wherein $\beta$ is the linear swelling coefficient of expansion, ER is the extraction-retention percentage and W is the equilibrium water content (%). Determination of the values for $\beta$, ER and W will be further described below.

The present invention will be further illustrated in detail with reference to the following Examples wherein parts and percentages are by weight unless otherwise specified.

In the Examples, the performances of the polymeric gels were determined as follows.

(i) Linear swelling coefficient of expansion ($\beta$)

A disc-shaped specimen having a thickness of from 0.2 to 0.3 mm and a diameter of 11 mm was cut from a cylindrical polymer block.

The specimen was dried at 40° C. and 1 mmHg for 16 hours, and its diameter "a" (in mm) was measured. Then, the specimen was first immersed in pure water at boiling temperature for 16 hours; further immersed in pure water at 37° C. for two hours; and, then, its diameter "b" (in mm) was measured in pure water at 37° C. The linear swelling coefficient of expansion ($\beta$) is expressed by the formula:

$\beta = b/a$ (ii) Extraction-retention percentage (ER)

The disc-shaped specimen was dried at 40° C. and 1 mmHg for 16 hours, and its weight "m" (in grams) was measured. Then, the specimen was immersed in pure water at boiling temperature for 16 hours and, then, dried at 40° C. and 1 mmHg for 16 hours. The weight "n" (in grams) of the specimen was measured again. The extraction-retention percentage (ER) is expressed by the formula:

ER (%) = (n/m) × 100

(iii) Equilibrium water content (W)

After immersion of the disc-shaped specimen in boiling water for 16 hours and then in 37° C. water for 2 hours, the weight of the specimen "p" (in grams) was measured. The equilibrium water content (W) is expressed by the formula:

W (%) = [(p-n)/p] × 100

(iv) Dimensional change upon boiling

The disc-shaped specimen used for the determination of its diameter "b" after immersion in boiling water for 16 hours, in the above-mentioned item (i), was further immersed in boiling water for 100 hours and then in pure water at 37° C. The diameter "c" (in mm) of the specimen was measured in the 37° C. water. The dimensional change upon boiling is expressed by the formula:

Dimensional change (%) = [(c-b)/b] × 100

(v) Mechanical properties

Measurements of tensile strength, elongation and Young's modulus were taken from a strip-shaped specimen having a width of 2 mm and a thickness of from 0.2 to 0.3 mm immersed in water maintained at a temperature of from 22° to 23° C. after the specimen was immersed in boiling water for 16 hours. An Instron-type tensile tester was used with the clamp distance being set at 10 mm and the clamp separation speed being set at 100 mm/min.

(vi) Degree of transparency

A plate-shaped specimen having a thickness of 5 mm was placed in pure water at a temperature of from 22° to 23° C. and the specimen's light transmittance was measured by using a tungsten lamp, a G filter (used in Hunter's colorimeter) and a quartz cell. As the reference, pure water was used. The transparency of the specimen was expressed by using the grading system stated below.

| Transparency of specimen | Light transmittance |
| --- | --- |
| A | More than 90% |
| B | 80–90% |
| C | Below 80% |

(vii) KMnO$_4$ reduction value

The concentration (in water) of the materials capable of reducing KMnO$_4$ which materials remain in the specimen after the specimen is immersed in boiling water for 16 hours, was determined as follows. Forty disc-shaped specimens each similar to that used in the above-mentioned item (i), (ii), (iii) or (iv) were immersed in boiling water for 16 hours to become swollen. The swollen specimens were placed in 50 ml of water and then boiled for 30 minutes. After the 50 ml of water were left to stand to cool to room temperature, 10 ml of the 50 ml water was placed in a conical flask. Twenty ml of an aqueous 0.01N potassium permanganate solution and 1.0 ml of 10% sulfuric acid were added into the flask, and the contents of the flask were boiled for 3 minutes. After the contents were cooled, 0.1 g of potassium iodide and 5 drops of an aqueous starch reagent solution were added to the contents in the flask. Then, the contents were titrated with an aqueous 0.01N sodium thiosulfate solution. The above-mentioned procedure was repeated wherein 10 ml of pure water were used instead of the water in which the swollen specimens were immersed. The concentration (in water) of the materials capable of reducing KMnO4 was expressed by the difference in the amounts in ml of the aqueous 0.01N sodium thiosulfate solution required for the titrations, which difference is hereinafter referred to as the "KMnO4 reduction value" for brevity.

colorless transparent polymeric in a rod-shape having a length of approximately 320 mm was obtained.

The properties of the discs cut from the rod are shown in Table I, below.

Table I

| Run No.[*1] | 1 | 2 | 3 | 4 | 1' | 2' | 3' |
|---|---|---|---|---|---|---|---|
| Cross-linking agent[*2] & | VMA | DVS | DVA | TAIC | DVB | TEGDMA | GMA |
| its amount (mole %/monomer) | 0.068 | 0.135 | 0.135 | 0.068 | 0.135 | 0.340 | 1.610 |
| Equilibrium water content (%) | 70 | 68 | 69 | 68 | 68 | 71 | 71 |
| Linear swelling coefficient of of expansion | 1.50 | 1.48 | 1.49 | 1.51 | 1.45 | 1.49 | 1.50 |
| Tensile strength (kg/cm$^2$) | 20 | 18 | 18 | 22 | 26 | 22 | 24 |
| Elongation at break (%) | 250 | 210 | 240 | 180 | 200 | 160 | 200 |
| Young's modulus (kg/cm$^2$) | 15 | 15 | 14 | 16 | 27 | 14 | 20 |
| Transparency | A | A | A | A | C | C | B |
| Extraction-retention (%) | 90 | 94 | 91 | 95 | 83 | 83 | 84 |
| Dimensional change upon boiling (%) | Below \|0.2\| | Below \|0.2\| | Below \|0.2\| | Below \|0.2\| | −1.7 | −3.5 | −2.6 |
| KMnO4 reduction value (ml) | 0.23 | 0.13 | 0.22 | 0.20 | 2.45 | 3.84 | 2.30 |
| D[*3] | 1.18 | 1.15 | 1.18 | 1.23 | — | — | — |

Note:
[*1] Run Nos. 1', 2' and 3' are comparative examples.
[*2] The abbreviations for the cross-linking agents are:
VMA = Vinyl methacrylate
DVS = Divinyl succinate
DVA = Divinyl adipate
TAIC = Triallyl isocyanurate
DVB = Divinylbenzene
TEGDMA = Triethylene glycol dimethacrylate
GMA = Glycidyl methacrylate

[*3] $D = 0 \left( \frac{100\beta^3}{ER} - 1 \right) \left( \frac{100}{W} - 1 \right)$

EXAMPLE 1

A polymerization reactor in the form of a tube with a circular cross-section made of polytetrafluoroethylene and having an inner diameter of 16 mm, an outer diameter of 18 mm and a length of 500 mm was vertically arranged. The tubular reactor was provided with a polytetrafluoroethylene bottom plate. The tubular reactor was charged with 80 g of a mixture comprised of 30 parts of methyl methacrylate, 70 parts of N-vinylpyrrolidone, 0.030 part (i.e., 0.020% by mole per mole of the total amount of methyl methacrylate and N-vinylpyrrolidone) of azobisisobutyronitrile, and a cross-linking agent shown in Table I, below. After the upper space inside the tubular reactor was flushed with nitrogen, the tubular reactor was sealed. The tubular reactor was immersed in a constant temperature bath maintained at 45° C. for 15 hours, and, then, the bath temperature was raised in a stepwise manner to 55° C., 60° C., 70° C. and 90° C. at an hourly interval. After the tubular reactor was maintained at 90° C. for one hour, it was transferred into a constant temperature air oven maintained at 120° C. and kept at that temperature for two hours. After the tubular reactor was gradually cooled, a

EXAMPLE 2

Following a procedure approximately similar to that set forth in Example 1, a rod-shaped colorless transparent polymer was manufactured. In this procedure, a tubular reactor similar to that used in Example 1 but made of polypropylene was used. The mixture charged in the tubular reactor was comprised of 25 parts of methyl methacrylate, 75 parts of N-vinylpyrrolidone, 0.017 part (i.e., 0.006% by mole per mole of the total amount of methyl methacrylate and N-vinylpyrrolidone) of 2,2'-azobis(4-methoxy-2,4-dimethylvaleronitrile, 0.010 part (i.e., 0.0044% by mole per mole of the total amount of methyl methacrylate and N-vinylpyrrolidone) of 1,1'-azobiscyclohexane-1-carbonitrile, and a cross-linking agent shown in Table II, below. The tubular reactor charged with the above-mentioned mixture was immersed in a constant temperature bath maintained at 25° C. for 15 hours. Thereafter, the bath temperature was raised to 30° C., maintained at that temperature for one hour and further raised in a stepwise manner to 40° C., 45° C., 50° C., 70° C. and 90° C. at intervals of 30 minutes. After the reactor was maintained at 90° C. for one hour, it was transferred into a constant temperature air oven maintained at 120° C. and kept therein at that temperature for two hours.

The properties of the thin discs cut from the rod-shaped polymer obtained by the above-mentioned bulk polymerization are shown in Table II, below.

Table II

| Run No.[*1] | 1 | 2 | 3 | 4 | 1' | 2' | 3' |
|---|---|---|---|---|---|---|---|
| Cross-linking agent[*2] & | VMA | VA | DVS | TAIC | DVB | EGDMA | GMA |
| its amount (mole %/monomer) | 0.102 | 0.102 | 0.146 | 0.146 | 0.146 | 0.730 | 5.400 |

Table II-continued

| Run No.*[1] | 1 | 2 | 3 | 4 | 1' | 2' | 3' |
|---|---|---|---|---|---|---|---|
| Equilibrium water content (%) | 73 | 73 | 73 | 73 | 73 | 73 | 72 |
| Linear swelling coefficient of expansion | 1.57 | 1.58 | 1.58 | 1.58 | 1.53 | 1.52 | 1.52 |
| Tensile strength (kg/cm$^2$) | 10 | 10 | 11 | 10 | 14 | 12 | 12 |
| Elongation at break (%) | 230 | 240 | 240 | 180 | 220 | 210 | 180 |
| Young's modulus (kg/cm$^2$) | 7 | 6 | 6 | 7 | 8 | 7 | 7 |
| Transparency | | | | | | | |
| Extraction-retention (%) | 92 | 93 | 91 | 93 | 82 | 81 | 83 |
| Dimensional change upon boiling (%) | Below \|0.2\| | Below \|0.2\| | Below \|0.2\| | Below \|0.2\| | −2.0 | −4.1 | −3.2 |
| KMnO$_4$ reduction value (ml) | 0.10 | 0.26 | 0.20 | 0.15 | 2.28 | 4.26 | 3.34 |
| D | 1.19 | 1.20 | 1.23 | 1.20 | — | — | — |

*[1]Run Nos. 1', 2' and 3' are comparative examples.
*[2]The abbreviations for the cross-linking agents are:
VMA, DVS, TAIC, DVB and GMA are defined in the footnote in Table I.
VA = vinyl acrylate
EGDMA = Ethylene glycol dimethacrylate

EXAMPLE 3

A tubular polymerization reactor with a circular cross-section made of polypropylene and having an inner diameter of 16 mm, an outer diameter of 18 mm and a length of 350 mm was vertically arranged. The tubular reactor was provided with a polypropylene bottom plate. The tubular reactor was charged with a mixture comprised of 30 parts of methyl methacrylate, 70 parts of N-vinylpyrrolidone, 0.157 part (i.e., 0.068% by mole per mole of the total amount of methyl methacrylate and N-vinylpyrrolidone) of triallyl isocyanurate, 0.043 part (i.e., 0.016% by mole per mole of the total amount of methyl methacrylate and N-vinylpyrrolidone) of triethylene glycol dimethacrylate and 0.031 part (i.e., 0.020% by mole per mole of the total amount of methyl methacrylate and N-vinylpyrrolidone) of azobisisobutyronitrile. The amount of the mixture was such that the mixture occupies a height of 300 mm in the tubular reactor. After the upper space inside the tubular reactor was flushed with argon, the tubular reactor was sealed and then immersed in a constant temperature bath maintained at 40° C. for 40 hours. Then, the bath temperature was raised to 50° C. and maintained at that temperature for 24 hours. Furthermore, the tubular reactor was maintained at 70° C. for 2 hours and then at 90° C. for 2 hours. Finally, the tubular reactor was transferred into a constant temperature air oven and maintained therein at 120° C. for 2 hours.

The properties of the thin discs cut from the rod-shaped polymer obtained by the above-mentioned bulk polymerization are shown in Table III, below.

EXAMPLE 4

Following a procedure similar to that set forth in Example 3, a rod-shaped colorless transparent polymer was manufactured. In this procedure, the tubular reactor used was similar to that used in Example 1 but had an outer diameter of 20 mm. The mixture charged into the tubular reactor was comprised of 25 parts of methyl methacrylate, 65 parts of N-vinylpyrrolidone, 10 parts of vinyl acetate, 0.230 part (i.e., 0.143% by mole per mole of the total amount of the above-mentioned three monomers) of divinyl succinate, 0.030 part (i.e., 0.010% by mole per mole of the total amount of the three monomers) of diethylene glycol dimethacrylate and 0.033 part (i.e., 0.021% by mole per mole of the total amount of the three monomers of azobisisobutyronitrile.

The properties of the thin discs cut from the rod-shaped polymer are shown in Table III, below.

EXAMPLE 5

Following a procedure similar to that set forth in Example 3, a rod-shaped colorless transparent polymer was manufactured. In this procedure, a tubular reactor similar to that used in Example 3 but different in that it was made of polytetrafluoroethylene and had a length of 500 mm was used. The tubular reactor was charged with 80 g of a mixture comprised of 30 parts of methyl methacrylate, 70 parts of N-vinylpyrrolidone, 0.071 parts of vinyl methacrylate, 0.043 part of triethylene glycol dimethacrylate and 0.015 part of azobisisobutyronitrile (the amounts of the vinyl methacrylate, triethylene glycol dimethacrylate and azobisisobutyronitrile were 0.068% by mole, 0.016% by mole and 0.010% by mole, respectively, per mole of the total mount of methyl methacrylate and N-vinylpyrrolidone). The tubular reactor was first immersed in a constant temperature bath and maintained at 45° C. for 15 hours, and, then, the temperature was raised to 50° C. Thereafter, the temperature was raised in a stepwise manner to 55° C., 60° C., 70° C. and then to 90° C. at intervals of one hour. After the reactor was maintained at 90° C. for one hour, it was transferred into a constant temperature air oven and maintained therein at 120° C. for 2 hours. After the reactor was gradually cooled, a rod-shaped polymeric gel having a length of approximately 320 mm was obtained.

The properties of the thin discs cut from the rod-shaped polymer are shown in Table III, below.

EXAMPLE 6

A tubular gasket made of an ethylene-propylene-terpolymer rubber and having an inner diameter of 3 mm, an outer diameter of 8 mm and a shore hardness (A scale) of 50° was sandwiched between two glass sheets, each 200 mm in length, 200 mm in width and 5 mm in thickness, in a manner such that the gasket was disposed around the entire periphery of the interspace between the two glass sheets. After the two glass sheets were clamped together with the gasket therebetween, the following mixture was injected into the interspace between the two glass sheets. The mixture used was comprised of 25 parts of methyl methacrylate, 75 parts of N-vinylpyrrolidone, 0.084 part of triallyl isocyanurate, 0.019 part of triethylene glycol dimethacrylate, 0.046 part of azobisisobutyronitrile and 0.0143 part of 2,2'-azobis(4-methoxy-2,4-dimethylvaleronitrile) (the amounts of the triallyl isocyanurate, triethylene glycol dimethacrylate, azobisisobutyronitrile and 2,2'-azobis(4-methoxy-2,4-dimethylvaleronitrile) were 0.039% by mole, 0.006% by mole, 0.030% by mole and 0.050% by mole, respectively, per mole of the total amount of methyl methacrylate and N-vinylpyrrolidone). The mixture-charged glass sheet molding unit was immersed in a constant temperature bath and maintained therein at 10° C. for 120 hours. The bath temperature was raised in a stepwise manner and the molding unit was maintained at 20° C. for 24 hours, at 30° C. for 17 hours, at 45° C. for 24 hours, at 55° C. for 2 hours, at 60° C. for 2 hours, at 70° C. for 2 hours and then at 90° C. for 2.5 hours. Thereafter, the mold unit was transferred into a constant temperature air oven and maintained therein at 120° C for 16 hours.

The properties of the thin discs cut from the polymer plate obtained by the above-mentioned procedure as shown in Table III below.

Table III

| Example No. | 3 | 4 | 5 | 6 |
|---|---|---|---|---|
| Equilibrium water content (%) | 70 | 73 | 70 | 75 |
| Linear swelling coefficient of expansion | 1.49 | 1.58 | 1.50 | 1.55 |
| Tensile strength (kg/cm$^2$) | 18 | 11 | 20 | 13 |
| Elongation at break (%) | 200 | 250 | 220 | 280 |
| Young's modulus (kg/cm$^2$) | 15 | 6 | 15 | 7 |
| Transparency Dimensional change upon boiling (%) | Below \|0.2\| | Below \|0.2\| | Below \|0.2\| | Below \|0.2\| |
| KMnO$_4$ reduction value (ml) | 0.20 | 0.30 | 0.35 | 0.40 |
| D | 1.16 | 1.20 | 1.18 | — |

EXAMPLE 7

This example shows clinical demonstrations wherein soft contact lenses obtained in the preceding Examples were tested on patients.

Tested during the demonstrations were soft contact lenses each having a diameter of 12.5 mm and a thickness (at the center portion) of 0.2 mm prepared from the rod-shaped polymer of Example 1 by the processes of lathing, polishing and swelling. Among 54 myopic patients, 47 patients could wear the soft contact lenses continuously over a period of at least seven days without removal of the lenses during sleeping.

These clinical demonstrations were repeated on the soft contact lenses respectively obtained from the polymers of Examples 2 through 6. The results thereof were approximately similar to those results mentioned above.

What is claimed is:

1. A cross-linked polymer composition providing a transparent polymeric gel having an equilibrium water content of at least 60% by weight based on the weight of the polymeric gel for use in soft contact lenses, which polymer composition is prepared by polymerizing, using a bulk polymerization procedure, a monomer mixture consisting essentially of an alkyl methacrylate and an N-vinyllactam in the presence of at least one cross-linking agent selected from the group consisting of vinyl acrylate, vinyl methacrylate, triallyl isocyanurate and vinyl carboxylates expressed by the formula:

R$+$COOCH$=$CH$_2)_n$ where R is a hydrocarbon radical having 1 to 10 carbon atoms and n is an integer of 2, 3 or 4.

2. The composition according to claim 1 wherein the alkyl methacrylate is methyl methacrylate.

3. The composition according to claim 1 wherein the N-vinyllactam is N-vinylpyrrolidone.

4. The composition according to claim 1 wherein said monomer mixture consists essentially of 10 to 40% by weight of an alkyl methacrylate, 60 to 80% by weight of N-vinyllactam and 0 to 20% by weight of at least one other copolymerizable monoethylenically unsaturated monomer, based on the weight of the monomer mixture.

5. The composition according to claim 1 wherein the amount of said cross-linking agent is from 0.01 to 5.0% by mole per mole of the monomer mixture.

6. The composition according to claim 1 wherein said polymer composition is polymerized in the presence of said cross-linking agent a further cross-linking agent consisting essentially of at least one polyethylene glycol dimethacrylate expressed by the formula:

wherein n is an integer of from 2 to 6.

7. The composition according to claim 6 wherein the amount of the polyethylene glycol dimethacrylate is less than 50% by mole based on the total amount of the cross-linking agent.

8. The composition according to claim 1 which has an extraction retention of 85% to 95% by weight as measured after immersion in water at 100° C. for 16 hours.

9. The composition according to claim 1 wherein said bulk polymerization is carried out in the presence of a thermally decomposing-type polymerization initiator.

10. The composition according to claim 1 wherein said bulk polymerization is carried out while the polymerization temperature is increased with the initial and final polymerization temperatures being from 10° to 50° C. and from 90° to 160° C., respectively.

11. The composition according to claim 1 wherein said bulk polymerization is carried out within a tube.

12. A soft contact lens, wearable continuously for a long period of time, which consists essentially of a transparent polymeric gel having an equilibrium water content of at least 60% by weight, based on the weight of the polymeric gel, said polymeric gel consisting essentially of the cross-linked polymer composition defined in claim 1.